United States Patent [19]
Stiefvater et al.

[11] Patent Number: 6,044,633
[45] Date of Patent: Apr. 4, 2000

[54] CONTROL APPARATUS FOR ROTATABLE GEARBOX ON CROP HARVESTER

[75] Inventors: Thomas L. Stiefvater, Ephrata; James T. Clevenger, Jr.; Larry W. Miller, both of Lancaster; Charles H. Hoffman, New Holland, all of Pa.

[73] Assignee: New Holland North America, Inc., New Holland, Pa.

[21] Appl. No.: 09/036,929

[22] Filed: Mar. 9, 1998

[51] Int. Cl.[7] .................................................. A01D 34/03
[52] U.S. Cl. ........................... 56/16.4 R; 56/6; 56/15.5; 180/53.4; 280/419; 280/442
[58] Field of Search .................................. 56/11.9, 15.2, 56/15.5, 6, DIG. 11, 15.7, 15.1, 255, 295; 180/53.4; 280/419, 442

[56] References Cited

U.S. PATENT DOCUMENTS

| | | | |
|---|---|---|---|
| 4,187,664 | 2/1980 | Meek et al. | 56/13.6 |
| 4,719,742 | 1/1988 | Ermacora et al. | 56/16.4 |
| 4,858,418 | 8/1989 | Von Allwoerden | 56/15.5 |
| 4,899,523 | 2/1990 | Frumholtz et al. | 56/155 |
| 4,986,064 | 1/1991 | Ermacora | 56/228 |
| 5,060,462 | 10/1991 | Helfer et al. | 56/14.9 |
| 5,136,828 | 8/1992 | Ermacora | 56/10.2 |
| 5,172,539 | 12/1992 | Jennings et al. | 56/6 |
| 5,179,822 | 1/1993 | McLean | 56/6 |
| 5,272,859 | 12/1993 | Pruitt et al. | 56/15.2 |
| 5,345,752 | 9/1994 | Pruitt et al. | 56/6 |
| 5,433,064 | 7/1995 | Schmitt et al. | 56/6 |
| 5,463,852 | 11/1995 | O'Halloran et al. | 56/6 |
| 5,566,535 | 10/1996 | Pruitt | 56/15.1 |

*Primary Examiner*—Thomas B. Will
*Assistant Examiner*—Arpad Fabian Kovacs
*Attorney, Agent, or Firm*—Frank A. Seemar; Larry W. Miller; J. William Stader

[57] ABSTRACT

A crop harvester having a wheeled frame with a tongue pivotally connected to the frame in the vicinity of a longitudinal centerline. The tongue, rotatable about a first generally vertical pivot axis, is swingable between extreme left and right positions on opposing sides of the longitudinal centerline with its distal end adapted for connection to a prime mover. A drive line transmits rotational power from the prime mover. A crop harvesting header, suspended from the frame in a forward disposition, includes operable components for engaging and processing crop material as the harvester is pulled over a field of standing crop. A gearbox receives rotational power from the drive line and transmits it to the operable components. The gearbox, mounted on the crop harvesting header in the vicinity of the longitudinal centerline forwardly of the first generally vertical pivot axis, is journaled for rotation about a second generally vertical pivot axis. A unique control system effects rotational movement of the gearbox in concert with the pivotal movement of the tongue to maintain appropriate alignment between the tongue and the gearbox.

7 Claims, 8 Drawing Sheets

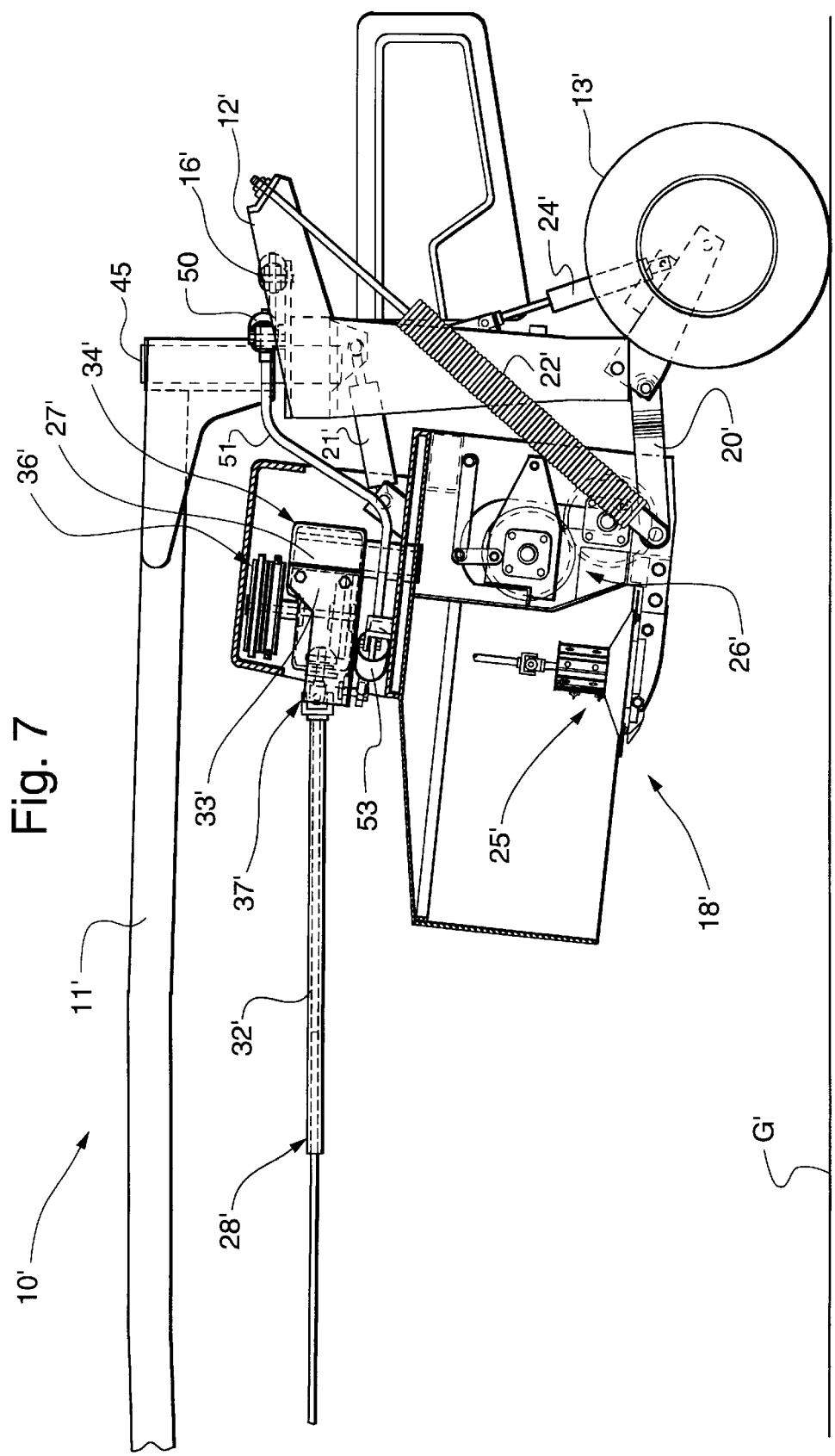

CONTROL APPARATUS FOR ROTATABLE GEARBOX ON CROP HARVESTER

FIELD OF THE INVENTION

The present invention relates generally to a pull-type harvesting implement with a pivotal tongue, and more particularly control apparatus for a rotatable gearbox incorporated in the mechanical drive system for various harvesting components of the implement.

BACKGROUND OF THE INVENTION

Pull type harvesting implements have been utilized for various harvesting operations for many years. These harvesting implements, supported primarily by ground engaging wheels, are made in a variety of configurations, but normally include components supported on a transverse frame to which is connected a pivotal draft member, commonly called a drawbar or draft tongue. For convenience, any draft member discussed in the following description will be referred to as a tongue.

In pull type harvesters, the tongue extends forwardly of the transverse frame for attachment to a prime mover, such as a tractor, which pulls the implement and provides operative power for various harvesting components supported by the main frame. For example, if the implement is a mower-conditioner, cutting and conditioning components mounted on the frame require operative power, which is provided mechanically or hydraulically by the tractor. Hydraulic drive systems are costly and have been fraught with operational problems, not the least of which is power limitations when large implements are involved. Thus, in light of such problems implement designers have turned to the use of a mechanical drive line between the tractor and the harvester.

U.S. Pat. Nos. 4,187,664, issued Feb. 12, 1980 in the name of Nigel W. Meek, et al, and No. 5,172,539, issued Dec. 22, 1992 in the name of Richard E. Jennings, et al, show examples of prior art pull type harvesting implements having a pivotal tongue and a mechanical drive system for providing operative power to conventional cutting and conditioning components mounted on a frame. In the implement shown in the '664 patent the tongue pivots about a vertical axis located at the left side of the implement and the mechanical drive system employs a telescopic shaft coupled to a gear box located also on the left side of the implement but forward of the tongue pivot axis. In the '539 patent an implement is shown wherein the vertical axis about which the tongue pivots is centrally located along the frame and the gear box, also centrally located, is located forward of the tongue pivot axis. Among other things, a centrally located tongue permits operation of the implement on both sides of the tractor, as well as superior maneuverability for steering around obstacles and cutting square corners.

Other examples of prior art pull type harvesting implements with centrally located pivot tongues and mechanical drive systems with centrally located gear boxes are shown in U.S. Pat. Nos. 4,899,523, issued Feb. 13, 1990 in the name of Johny Frumholtz, et al, and No. 4,719,742, issued Jan. 19, 1988 in the name of Rino Ermacora, et al. In both these implements the drive shaft for the gear box is disposed within the tongue.

Another pull-type harvester configuration of the same general nature as those discussed above is the pivot tongue windrower shown in U.S. Pat. No. 5,272,859, issued on Dec. 28, 1993 in the name of Martin E. Pruitt, et al. This patent discloses a central gearbox mounted on the header such that the gearbox is movable relative to the implement frame. The gearbox is rotatable about a vertical axis so that the input shaft into the gearbox can generally follow the pivotal movement of the tongue, which pivots about a rearwardly located vertical axis. This eliminates the occurrence of sharp angles at the gear box under conditions where the tongue swings between its extreme angular positions.

To accomplish the coordinated movement of the rotation of the gearbox with the pivotal movement of the tongue, the '859 patent discloses a telescoping steering mechanism that interconnects the tongue and the gearbox such that the gearbox is rotated in response to swinging movement of the tongue relative to the implement frame. The telescopic action of the steering mechanism is operable to accommodate the changes in distance of the respective connecting points of the telescoping mechanism between the tongue and the gearbox, i.e., as the tongue swings from side to side, the distance changes between the different horizontally spaced pivot axes of the tongue and the gearbox. The telescopic action of the steering mechanism, along with a horizontal pivot or gimble, also allows the steering mechanism to follow the vertical movement of the header relative to the tongue without restricting movement of the header or the tongue.

This telescopic steering mechanism, as taught by the '859 patent, suffers from operational problems associated with vibration due to the loosely fitting telescopic parts and wear of the sliding parts. The implement, as can be seen in the drawings of the '859 patent, is provided with a rotatable cutting mechanism and a crop conditioning mechanism, which are typical of harvester components. The operation of harvesting components, such as these, provides a substantial amount of vibration within the implement. Since the steering mechanism is loosely constructed to permit the necessary relative pivotal movements of the header and the tongue, operational vibrations are not uncommon, leading to noise and wear in other elements and parts of the harvester. Furthermore, the looseness of the elements and the sliding action therebetween also cause substantial wear in the steering mechanism itself, resulting in increased likelihood of malfunction, or even worse, failure leading to costly downtime.

Additionally, the mechanism of the '859 patent is subject to side forces from the torque applied to the gearbox by the drive mechanism and the cutterbar forces within the crop harvesting header on which the rotatable gearbox is mounted. These external forces place a side load on the steering mechanism linkage and can result in a binding of the telescoping tubes forming the linkage, which results in a thrust load on the gearbox and the connecting apparatus, particularly when the header rises and the telescopic tubes telescope together. These telescoping tubes also present a hinge-like degree of freedom which can contribute further to vibrations in the implement.

SUMMARY OF THE INVENTION

Accordingly, an important object of the present invention is to provide a crop harvester that overcomes the above mentioned problems encountered in the prior art.

Another important object is to provide a pull-type, pivot-tongue harvester having a mechanical drive line coupled to a pivotal gearbox for operating the components of the harvester with improved serviceability, reliability and repairability.

In pursuance of these and other important objects the present invention contemplates a crop harvester having a wheeled frame, a tongue pivotally connected to the frame in the vicinity of a longitudinal centerline thereof, the tongue being rotatable about a first generally vertical pivot axis, means for swinging the tongue between extreme left and right positions on opposing sides of the longitudinal centerline and being adapted at a distal end for connection to a prime mover, a drive line for transmitting rotational power from the prime mover, a crop harvesting header suspended from the frame and being forwardly disposed relative thereto, the crop harvesting header having operable components for engaging and processing crop material as the crop harvester is moved forwardly, a gearbox for receiving rotational power from the drive line and transmitting it to the operable components of the crop harvesting header, means for mounting the gearbox on the crop harvesting header in the vicinity of the longitudinal centerline and forwardly of the first generally vertical pivot axis, the means for mounting said gearbox including journal means for supporting the gearbox for rotation thereof about a second generally vertical pivot axis, and unique control means for effecting rotational movement of the gear box in concert with the pivotal movement of the tongue. More particularly, the control means comprise first and second hydraulic means, and means interconnecting the first and second hydraulic means in a master and slave relationship, the first hydraulic means coupled to the tongue for sensing the position thereof, and the second hydraulic means coupled to the means for mounting the gearbox for providing a force to rotate the gearbox under conditions where the tongue is rotated about the first vertical pivot axis.

The foregoing and other objects, features and advantages of the invention will appear more fully hereinafter from a consideration of the detailed description which follows, in conjunction with the accompanying sheets of drawings wherein two embodiments of the present invention are illustrated by way of example. It is to be expressly understood, however, that the drawings are for illustrative purposes and are not to be construed as defining the limits of the invention.

DESCRIPTION OF THE DRAWINGS

FIG. 7 is a partial left side elevational view of the crop harvesting machine shown in FIG. 5 with the hitch end of the tongue and the forward portion of the drive line being broken away for purposes of clarity, the header being raised to a transport position.

DESCRIPTION OF THE INVENTION

Figure 1:
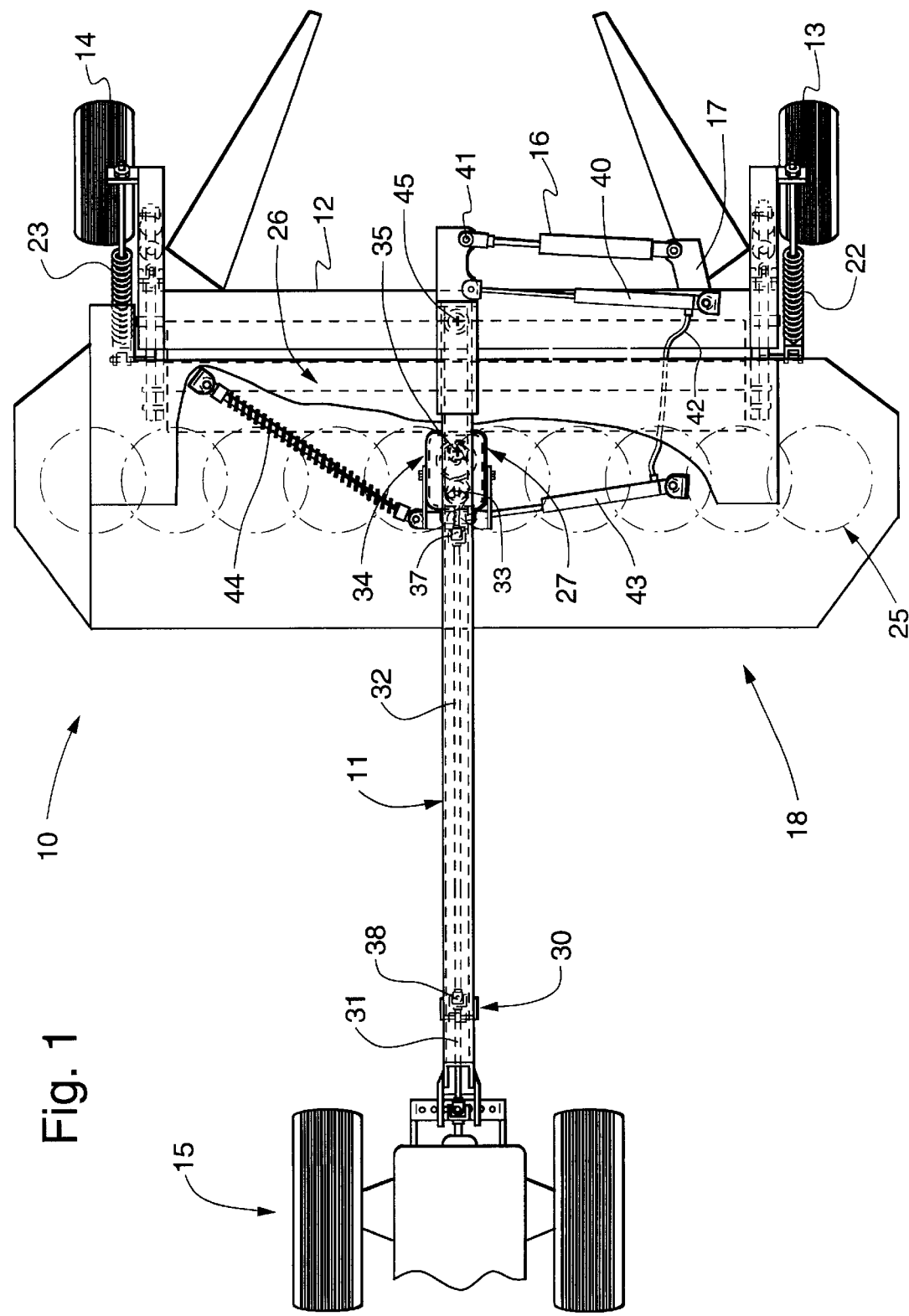
FIG. 1 is a top plan view of a crop harvesting machine incorporating the principle embodiment of the present invention, the harvesting machine being shown connected to a tractor.

Referring now to the drawings for a more detailed description of the preferred embodiment and an alternative embodiment of the present invention, left and right references are used as a matter of convenience and are determined by standing at the rear of the machine facing the hitch portion of the drawbar, i.e., the normal operative direction of travel.

Figure 2:
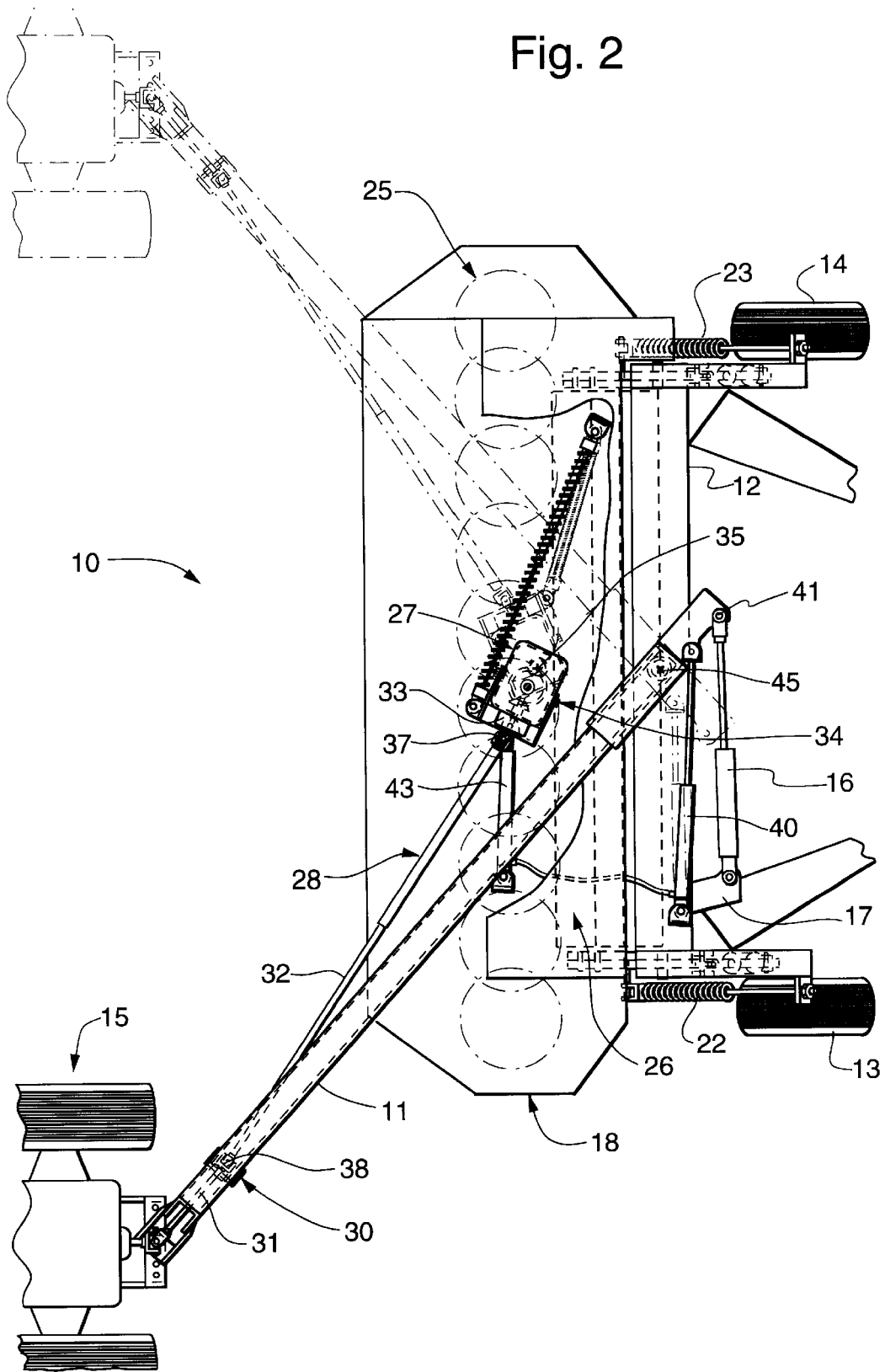
FIG. 2 is a top plan view of the crop harvesting machine shifted to a harvesting position rearwardly and to the right of the tractor. This view also depicts in phantom outline the orientation of the tractor, drawbar and drive line under conditions where the crop harvesting machine has been shifted to a harvesting position rearwardly and to the left of the tractor.
Figure 3:
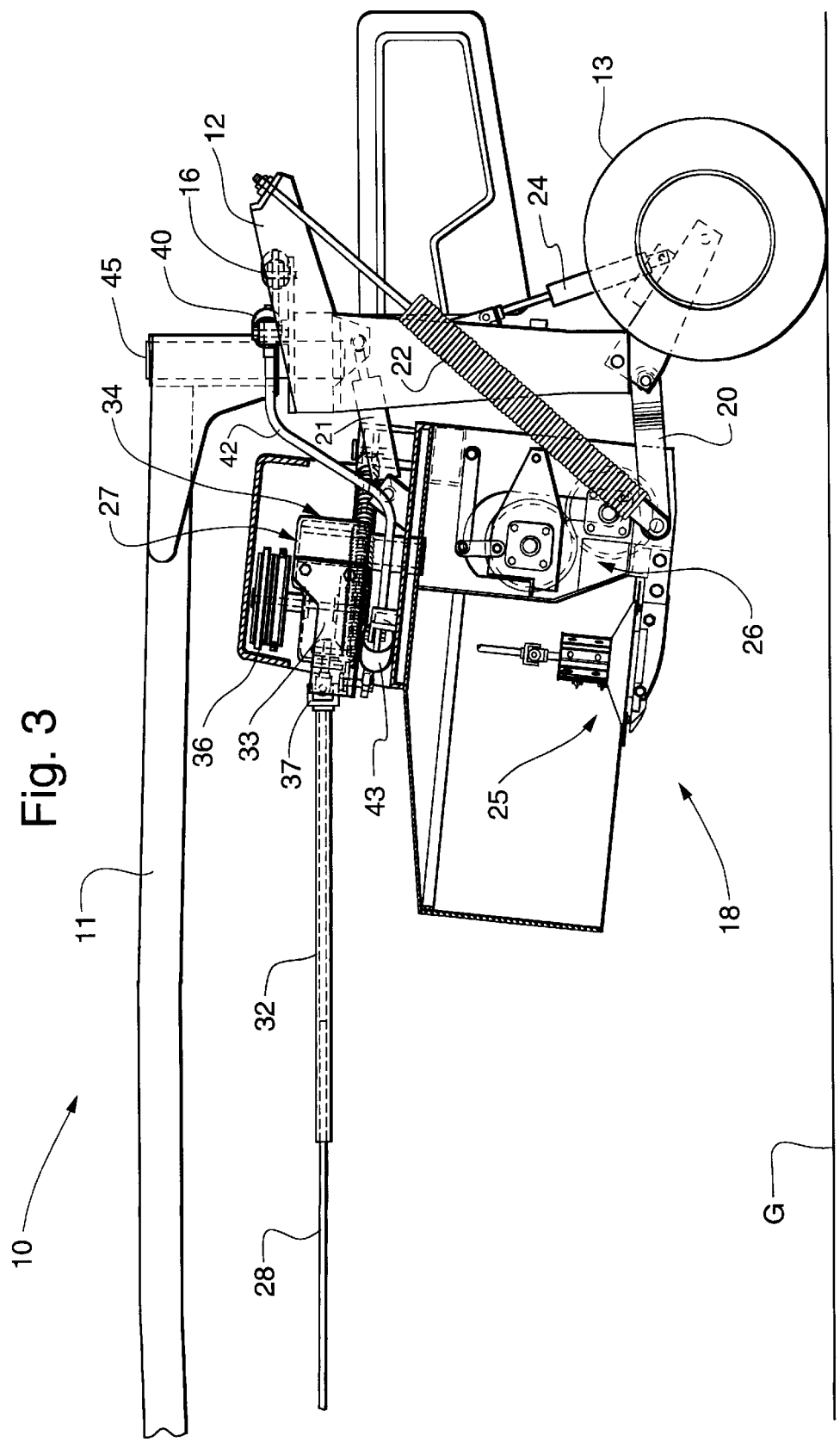
FIG. 3 is a partial left side elevational view of the crop harvesting machine shown in FIG. 1 with the hitch end of the tongue and the forward portion of the drive line being broken away for purposes of clarity, the header being raised to a transport position.

FIGS. 1–3 show a crop harvesting machine, generally designated by reference numeral 10, in which the elements of the preferred embodiment of the present invention are incorporated. More specifically, a centrally pivoted tongue 11 extends forwardly of a transverse implement frame 12, which is supported by conventional ground engaging wheels 13, 14. A tractor 15 is attached to machine 10, for towing it over the surface of ground G (see FIG. 3) during transport or field operation.

In FIGS. 1 and 3 the inoperative position of the machine is shown, i.e., harvester 10 is raised and directly behind tractor 15 for transport. In FIG. 2 harvester 10 is shown swung to the extreme right operative position in solid lines and it is shown in the extreme left operative position in phantom outline. A tongue swing cylinder 16, connected between tongue 11 and bracket 17 (integral with frame 12), pivots the tongue to these operative positions in a conventional manner.

A crop harvesting header 18 is suspended from transverse frame 12 by links 20, 21 and springs 22, 23 for general vertical movement relative to frame 12 by means of conventional lift cylinders 24 (only one shown). Header 18 includes conventional harvesting components, including a cutterbar 25, preferably in a known disc configuration, for severing standing crop material, and a conditioning mechanism 26, preferably of the known counter-rotating roll configuration, the latter receiving severed crop material from cutterbar 25 and then conditioning it by crushing or crimping the stems thereof. U.S. Pat. No. 5,272,859, described above, illustrates a prior art harvester of the general type shown in FIGS. 1–3, and is hereby incorporated by reference.

Header 18 further includes a centrally mounted gearbox 27 operable to receive rotational power from a conventional power-take-off driveline 28 (PTO) rotatably supported at bracket 30 by forwardly extending tongue 11 and connectable to tractor 15, as is well known in the art. The drive line includes a primary PTO 31, a secondary telescopic PTO 32, and a slip clutch 33. In the event the length of the tongue so dictates, a tongue mounted drive shaft can be utilized between the primary and secondary PTO's in a conventional manner. A shaft of this nature is commonly referred to as a jack shaft. The slip clutch, not shown in detail, is a well known expedient for providing slippage when excessive torque is encountered. This protects the drive components should jamming occur from rocks or excessive debris. The operative combination of gearbox 27 and clutch 33 are adjacently associated in an conventional manner and enclosed in a mounting assembly 34 rotatable about a generally vertical axis 35, about which an upwardly extending output shaft of the gearbox rotates. Power is provided for driving the harvester components via a belt drive assembly 36 coupled to the output shaft of the gearbox in a well known manner. The reason mounting assembly 34 for the gearbox/clutch is rotatable is so that the universal joint coupling drive line 28 to the clutch/gearbox combination, i.e., the rotatable gearbox assembly, is capable of following the transverse pivotal movements of tongue 11 and thereby keep universal joints 37, 38 within acceptable bend angles. To this end, the present invention contemplates a unique system for maintaining approximate alignment between the drive shaft and tongue during swing operation between the extreme left and right tongue positions.

A first hydraulic cylinder 40 is pivotally connected at its rod end to the rear portion of tongue 11 in the vicinity of the pivotal connection 41 of swing cylinder 16, while at its other end it is pivotally connected to frame 12. Cylinder 40 is operatively connected via line 42 to a second hydraulic cylinder 43 in a master and slave relationship. Both cylinders, 40 and 43, are single acting. Second cylinder 43 is pivotally connected at its rod end to the front end portion of pivotal gear box mounting assembly 34, while at its other end it is pivotally connected to the harvester header frame. Also pivotally affixed to the front end portion of pivotal gear box assembly 34 is one end of compression spring 44. The other end of compression spring 44 is secured to the header frame. The master slave relationship of single acting cylinders 40, 43 is best described by reference to schematic diagrams shown in FIGS. 4A, 4B and 4C, where the elements are conveniently associated in close proximity for illustrative purposes. It should be noted that although gearbox 27 is referred to throughout the following description of operation, mounting assembly 34, clutch 33 and gearbox 27 are integral insofar as rotation about the second pivot axis is concerned.

Figure 4A:
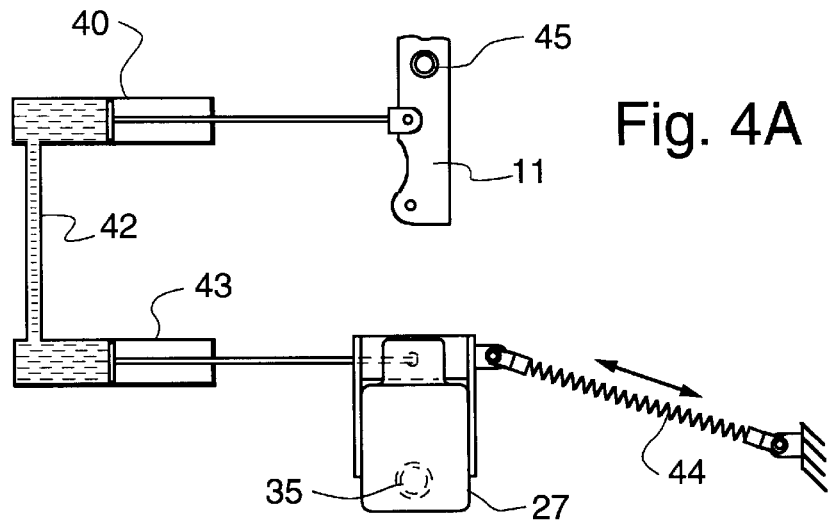
FIGS. 4A through 4C are three similar schematic diagrams showing key parts of the hydraulic system for the harvesting machine. These diagrams illustrate the transport, and extreme left and right positions of the tongue.

FIG. 4A shows the elements in the transport position, i.e., tongue 11 is directly aligned with an imaginary longitudinal centerline as shown in FIG. 1. Gearbox 27 is centered about second pivot axis 35, and the pistons of first and second cylinders 40, 43 are midway with communication of hydraulic fluid accommodated by their respective ports. The force of compression spring 44 is such that gearbox 27 is maintained in its centrally aligned position.

Figure 4B:
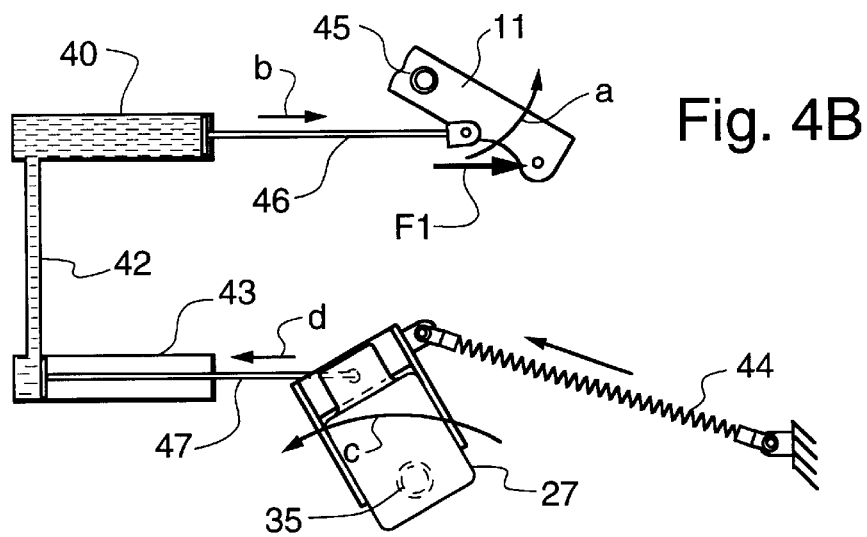

Referring to FIG. 4B, tongue 11 is pivoted about a first pivot axis 45 in direction a by force F1 applied by swing cylinder 16 (not shown in FIGS. 4A–4C), piston rod 46 moves in direction b, compression spring 44 forces gearbox 27 to rotate in direction c and force piston rod 47 in direction d, thus maintaining desired relationship of gearbox and tongue when the tongue is swung to one extreme outer position.

Figure 4C:
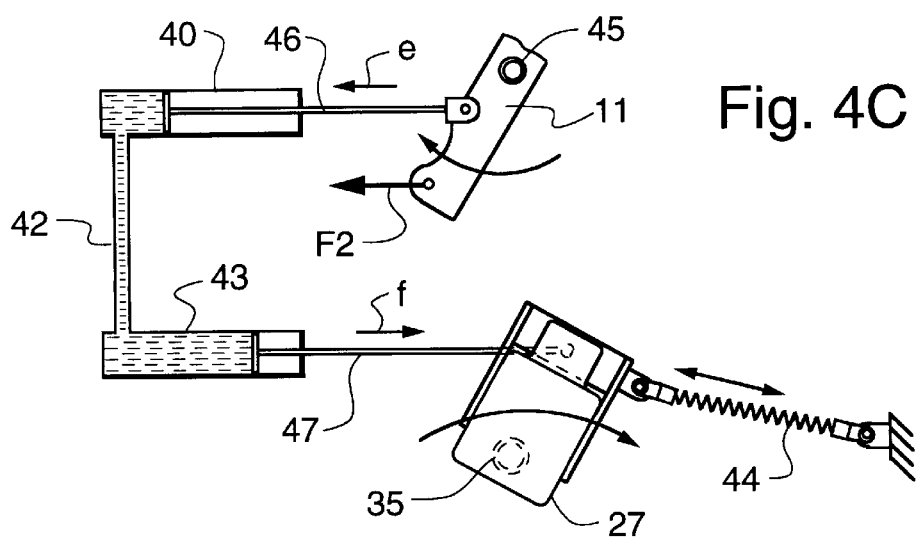

In FIG. 4C the tongue is shown swung to its other extreme outer position, i.e., a force F2 in the opposite direction is applied by swing cylinder 11, piston rod 46 is retracted in direction e, which forces piston rod 47 to extend in direction f, rotating gearbox 27 about axis 35 which compresses compression spring 44. When the swing tongue reaches it extreme position, rod 46 is maintained in the retracted position and rod 47 in maintained in the extended position with compression spring 44 compressed to a condition where it is ready to force rod 47 in direction d when piston 46 is subsequently moved in a direction b by tongue 11.

Figure 5:
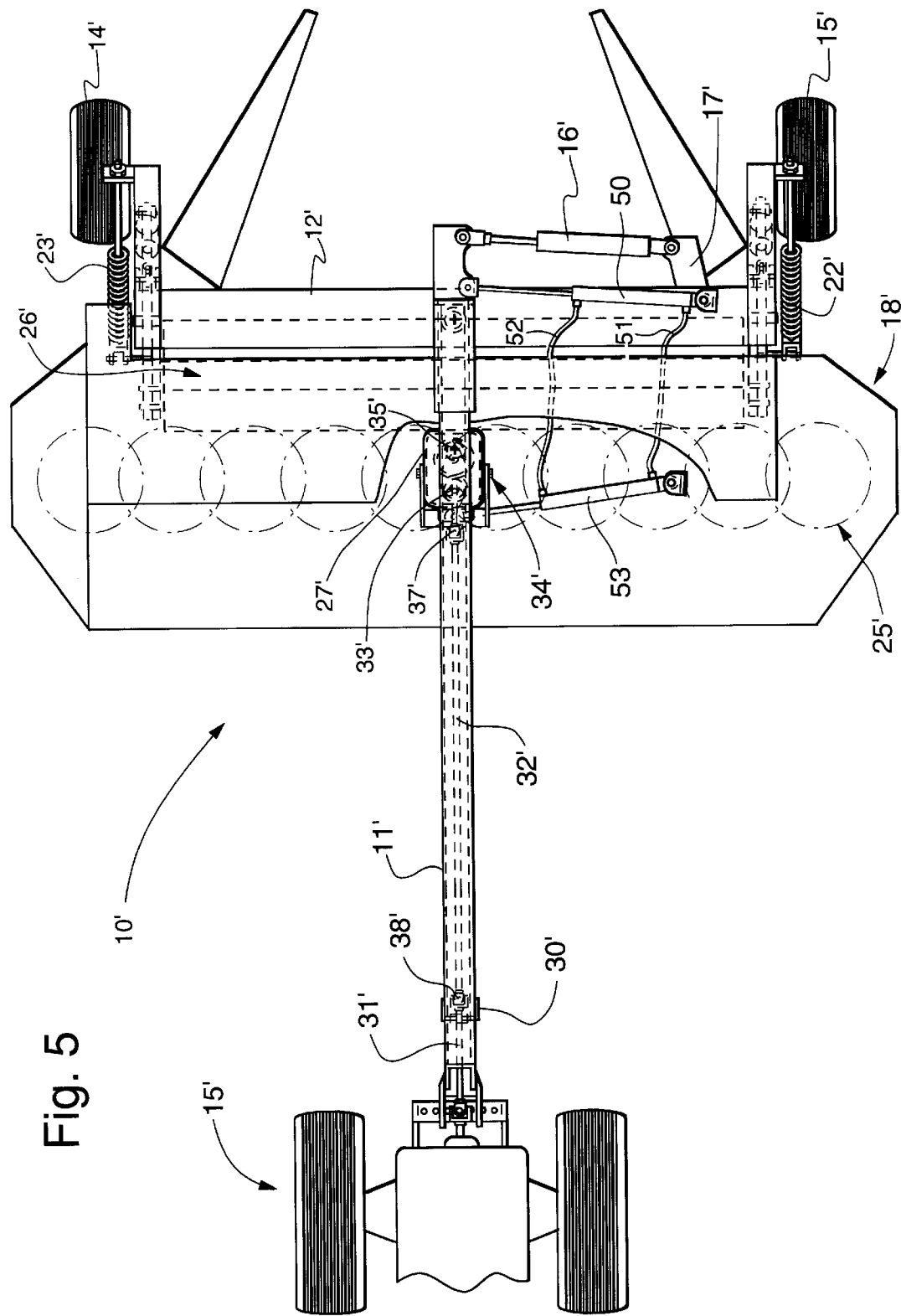
FIG. 5 is a top plan view of a crop harvesting machine incorporating an alternative principle embodiment of the present invention, the harvesting machine being shown connected to a tractor.
Figure 6:
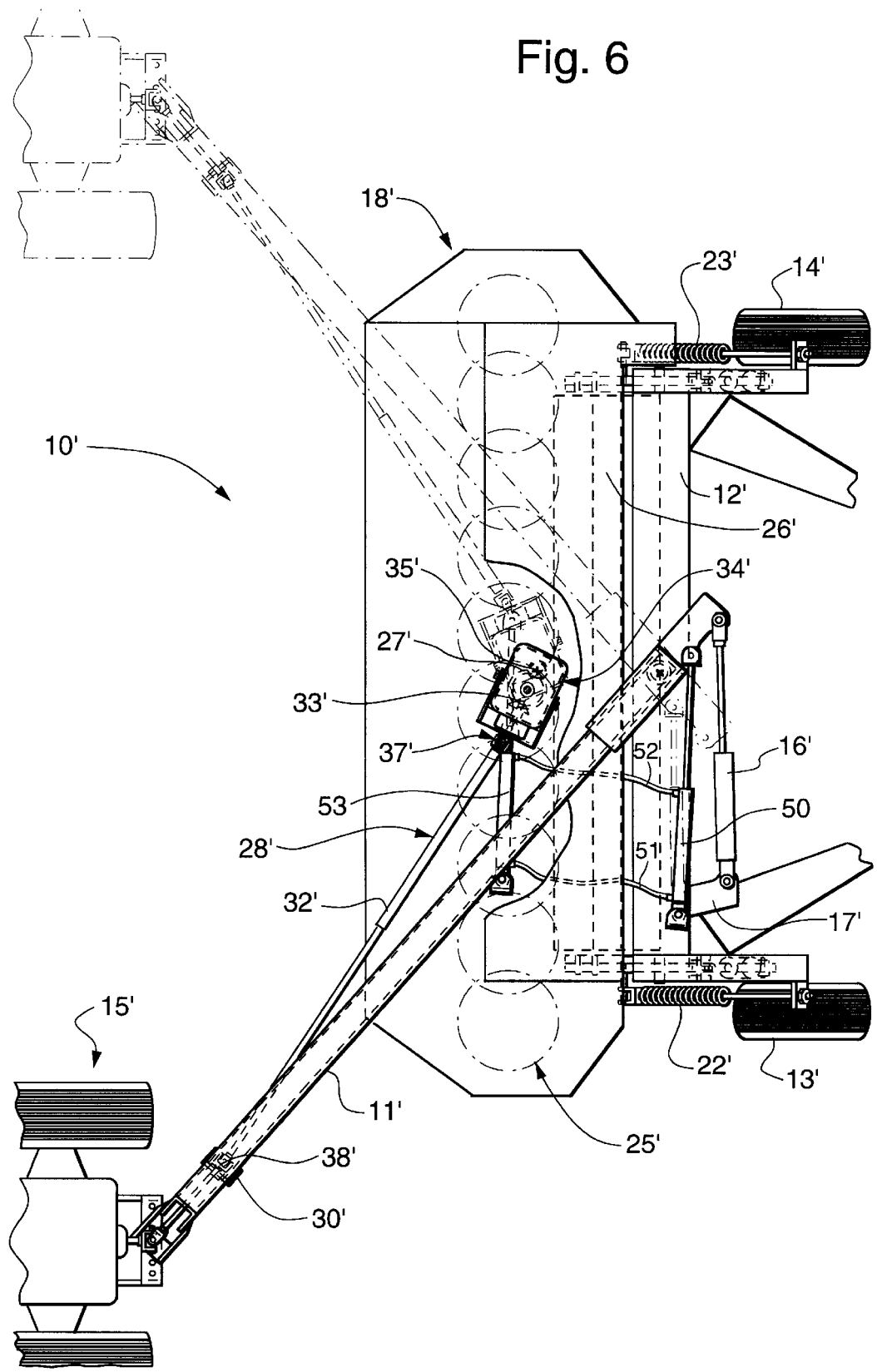
FIG. 6 is a top plan view of the crop harvesting machine shown in FIG. 5 shifted to a harvesting position rearwardly and to the right of the tractor. This view also depicts in phantom outline the orientation of the tractor, drawbar and drive line under conditions where the crop harvesting machine has been shifted to a harvesting position rearwardly and to the left of the tractor.

Referring now to FIGS. 5–7 for a detailed description of an alternative embodiment of the present invention, primed reference numerals are used in instances where the elements being designated are the same or similar to those of the embodiment of FIGS. 1–3. In the embodiment of FIGS. 5–7, crop harvesting machine 10' is shown in which a centrally pivoted tongue 11' extends forwardly of a transverse implement frame 12', which is supported by conventional ground engaging wheels 13', 14'. A tractor 15' is attached to machine 10, for towing it over the surface of the ground, designated generally by reference letter G' (see FIG. 7), during transport or field operation.

In FIGS. 5 and 7 the inoperative position of the machine is shown, i.e., harvester 10 is raised and directly behind tractor for transport. In FIG. 6 harvester 10' is shown swung to the extreme right operative position in solid lines and it is shown in the extreme left operative position in phantom outline. A tongue swing cylinder 16', connected between tongue 11' and bracket 17' (integral with frame 12'), pivots the tongue to these operative positions in a conventional manner.

A crop harvesting header 18' is suspended from transverse frame 12' by links 20', 21' and springs 22', 23' for general vertical movement relative to frame 12' by means of conventional lift cylinder 24', (only one shown). Header 18' includes conventional harvesting components, including a cutterbar 25', preferably in a known disc configuration, for severing standing crop material, and a conditioning mechanism 26', preferably of the known counter-rotating roll configuration, the latter receiving severed crop material from cutterbar 25' and then conditioning it by crushing or crimping the stems thereof.

Header 18' further includes a centrally mounted gearbox 27' operable to receive rotational power from a conventional power-take-off driveline 28' (PTO) rotatably supported at bracket 30' by forwardly extending tongue 11' and connectable to tractor 15', as is well known in the art. The drive line includes a primary PTO 31', a secondary telescopic PTO 32', and a slip clutch 33'.

As in the principal embodiment, gearbox 27' and clutch 33', enclosed in a mounting assembly 34', all form an integral unit rotatable about a generally vertical axis 35, about which an upwardly extending output shaft of the gearbox rotates. Power is provided for driving the harvester components via a belt drive assembly 36' in a well known manner. The purpose of mounting assembly 34' is so that the integral gearbox/clutch unit is capable of following the transverse pivotal movements of tongue 11' and thereby keep universal joints 37', 38' within acceptable bend angles. To this end, the alternative embodiment of the present invention contemplates a unique system for maintaining approximate alignment between the drive shaft and tongue during swing operation between the extreme left and right tongue positions.

A first hydraulic cylinder 50 is pivotally connected at its rod end to the rear portion of tongue 11' in the vicinity of the pivotal connection 41' of swing cylinder 16', while at its other end it is pivotally connected to frame 12'. Cylinder 50 is operatively connected via lines 51, 52 to a second hydraulic cylinder 53 in a master and slave relationship. Both cylinders, 50 and 53, are double acting. Second cylinder 53 is pivotally connected at its rod end to the front end portion of pivotal gear box mounting assembly 34', while at its other end it is pivotally connected to the harvester header frame. The master slave relationship of double acting cylinders 50, 53 is best described by reference to schematic diagrams shown in FIGS. 8A, 8B and 8C, where the elements are conveniently associated in close proximity for illustrative purposes, while applying the same rationale as above with respect to the integral relationship of the gearbox, clutch and mounting assembly.

Figure 8A:
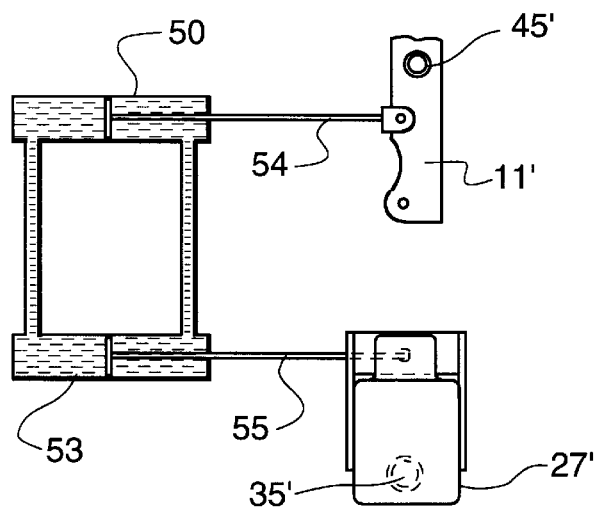
FIGS. 8A through 8C are three similar schematic diagrams showing key parts of the hydraulic system for the harvesting machine shown in FIG. 5. These diagrams illustrate the transport, and extreme left and right positions of the tongue.

FIG. 8A shows the elements in the transport position, i.e., tongue 11' is directly aligned with an imaginary longitudinal centerline as shown in FIG. 5. Gearbox 27' is centered about second pivot axis 35, and the pistons of cylinders 50, 53 are midway with communication of hydraulic fluid accommodated by their respective dual ports.

Figure 8B:
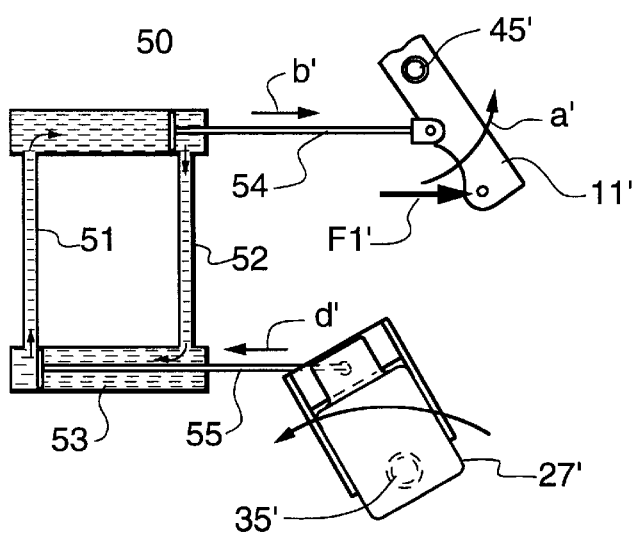

Referring to FIG. 8B when tongue 11' is pivoted about first pivot axis 45' in direction a' by force F1' applied by swing cylinder 16' (not shown in FIGS. 8A–8C), piston rod 54 moves in direction b', and piston rod 55 moves in the opposite direction d', thus maintaining desired relationship of gearbox and tongue when the tongue is swung to one extreme outer position.

Figure 8C:
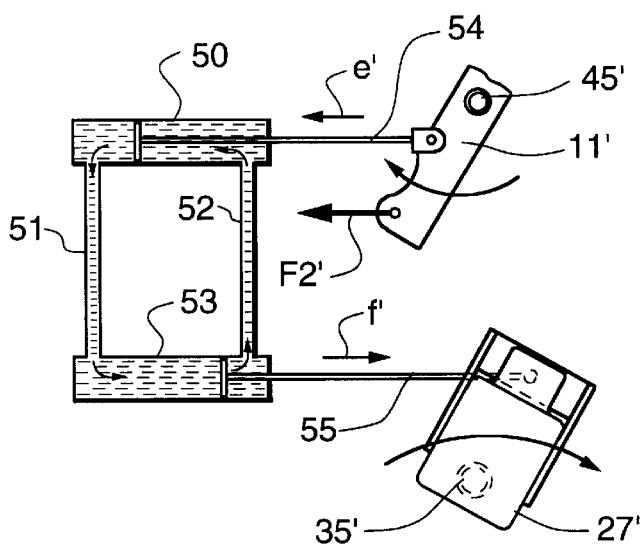

In FIG. 8C the tongue is shown swung to its other extreme outer position, i.e., a force F2' in the opposite direction is applied by swing cylinder 16', piston rod 54 is retracted in direction e', which forces piston rod 55 to extend in direction f', rotating gearbox 27' about axis 35' by virtue of the master slave relationship between the cylinders. When the swing tongue reaches it extreme position rod 54 is maintained in the retracted position and rod 55 in maintained in the extended position due to the communication of hydraulic fluid between the interconnected dual ports.

In operation, adjustment of gearbox tongue alignment is achieved by selection of cylinders having appropriate diameters, or by varying the lever distance of one of the paired cylinders.

Of the many implicit and explicit advantages of the present invention one of the most important is the provision of a center pivot tongue harvesting machine having a mechanical drive with a rotatable gearbox assembly that tracks the tongue when it swings, in a manner that obviates the need for mechanical steering links. Among other things, gearbox rotation in the manner described above improves component reliability and reduces overall vibration during operation.

While preferred structure in which the principles of the present invention are shown and described in the embodiments set forth above, it is to be understood that the invention is not limited to such preferred structure, but that, in fact, widely different means of varying scope and configuration may be employed in the practice of the invention.

Having thus described the invention, what is claimed is:

1. In a crop harvester having
    a wheeled frame,
    a tongue pivotally connected to said frame in the vicinity of a longitudinal centerline thereof, said tongue being rotatable about a first generally vertical pivot axis,
    means for swinging said tongue between extreme left and right positions on opposing sides of said longitudinal centerline and being adapted at a distal end for connection to a prime mover,
    a drive line for transmitting rotational power from said prime mover when coupled thereto,
    a crop harvesting header suspended from said frame and being forwardly disposed relative thereto, said crop harvesting header having operable components for engaging and processing crop material as said crop harvester is moved forwardly,
    a gearbox for receiving rotational power from said drive line and transmitting it to said operable components of said crop harvesting header,
    means for mounting said gearbox on said crop harvesting header in the vicinity of said longitudinal centerline forwardly of said first generally vertical pivot axis,
        said means for mounting said gearbox including journal means for supporting said gearbox for rotation thereof about a second generally vertical pivot axis, and
    control means for effecting rotational movement of said gear box in concert with the pivotal movement of said tongue, the improvement comprising
        said control means comprise first and second hydraulic means, and means interconnecting said first and second hydraulic means in a master and slave relationship,
        said first hydraulic means coupled to said tongue for sensing the position thereof, and
        said second hydraulic means coupled to said means for mounting said gearbox for providing a force to rotate said gearbox under conditions where said tongue is rotated about said first vertical pivot axis.

2. A crop harvester as set forth in claim 1 wherein
said first hydraulic means comprise a first single acting hydraulic cylinder, and
said second hydraulic means comprise a second single acting hydraulic cylinder.

3. A crop harvester as set forth in claim 2 wherein
said second single acting hydraulic cylinder is operative between extended and contracted positions corresponding to said extreme left and right positions of said tongue, and
said control means further comprise supplemental means for providing a force that assists said second hydraulic cylinder to rotate said gear box.

4. A crop harvester as set forth in claim 3 wherein
said supplemental means comprise a spring.

5. A crop harvester as set forth in claim 4 wherein
said second single acting hydraulic cylinder further comprises a piston that is operative between fully extended and fully retracted conditions corresponding to said extreme left and right positions of said tongue, and
said spring is normally compressed to provide said force that assists the rotation of said gear box by urging said piston to its fully retracted condition.

6. A crop harvester as set forth in claim 1 wherein
said first hydraulic means comprise a first double acting hydraulic cylinder, and
said second hydraulic means comprise a second double acting hydraulic cylinder.

7. A crop harvester as set forth in claim 6 wherein
said means interconnecting said first and second hydraulic means including parallel connections therebetween,
    said first double acting hydraulic cylinder is operative between extended and contracted positions corresponding to said extreme left and right positions, respectively, of said tongue, and
    said second double acting hydraulic cylinder is operative between extended and contracted positions corresponding to said extreme right and left positions, respectively, of said tongue.

* * * * *